US012630001B2

(12) United States Patent
Wikblom et al.

(10) Patent No.: US 12,630,001 B2
(45) Date of Patent: May 19, 2026

(54) VEHICLE WITH CENTER UNIT AND FRAME RAILS

(71) Applicant: Volvo Truck Corporation, Gothenburg (SE)

(72) Inventors: Erik Wikblom, Gothenburg (SE); Avinash Thirtharajan, Bangalore Karnataka (IN); Erik Ejdervik, Gothenburg (SE); Leonardo Boaventura De Souza, Gothenburg (SE); Mikael Boisen, Gothenburg (SE); Jonas Björkenfors, Trollhättan (SE)

(73) Assignee: Volvo Truck Corporation, Gothenburg (SE)

( * ) Notice: Subject to any disclaimer, the term of this patent is extended or adjusted under 35 U.S.C. 154(b) by 283 days.

(21) Appl. No.: 18/496,027

(22) Filed: Oct. 27, 2023

(65) Prior Publication Data

US 2024/0140188 A1 May 2, 2024

(30) Foreign Application Priority Data

Nov. 1, 2022 (EP) .................................... 22204878

(51) Int. Cl.
*B60K 1/04* (2019.01)
(52) U.S. Cl.
CPC ........ *B60K 1/04* (2013.01); *B60K 2001/0438* (2013.01)
(58) Field of Classification Search
CPC .......................... B60K 1/04; B60K 2001/0438
See application file for complete search history.

(56) References Cited

U.S. PATENT DOCUMENTS

| | | | |
|---|---|---|---|
| 4,836,321 A | 6/1989 | Baumann | |
| 6,971,691 B1* | 12/2005 | Heatherington | ........ B60R 19/18 293/154 |

(Continued)

FOREIGN PATENT DOCUMENTS

| | | |
|---|---|---|
| JP | H11334648 A | 12/1999 |
| JP | 2005262951 A | 9/2005 |

(Continued)

OTHER PUBLICATIONS

Extended European Search Report for European Patent Application No. 22204878.7, mailed Apr. 18, 2023, 10 pages.

*Primary Examiner* — Edwin A Young
(74) *Attorney, Agent, or Firm* — Withrow & Terranova, PLLC

(57) ABSTRACT

A vehicle with a center unit, a first frame rail, and a second frame rail located on opposite sides of a center plane and wherein the center unit is located at least partially between the first frame rail and the second frame rail in transversal direction, and a connector being connected to first anchor portion of the vehicle and to second anchor portion of the vehicle and extending between the first anchor portion and the second anchor portion, the first anchor portion rigidly connected to first frame rail and second anchor portion being rigidly connected to the center unit or to the second frame rail, the vehicle having initial state with initial distance between first anchor portion and second anchor portion, the vehicle also being adapted to assume deformed state with deformed distance between first anchor portion and second anchor portion, the deformed distance being greater than the initial distance.

19 Claims, 10 Drawing Sheets

(56) References Cited

U.S. PATENT DOCUMENTS

| 8,573,621 | B1 * | 11/2013 | Reynolds | ............. | B60G 11/225 |
| | | | | | 280/124.13 |
| 10,967,720 | B2 * | 4/2021 | Caliskan | ................. | B60K 1/00 |
| 2014/0095019 | A1 | 4/2014 | Okamura et al. | | |
| 2022/0063727 | A1 * | 3/2022 | Faruque | ................. | B62D 21/11 |
| 2022/0134981 | A1 * | 5/2022 | Baccouche | ........... | B60R 19/205 |
| | | | | | 293/107 |

FOREIGN PATENT DOCUMENTS

| JP | 2007168484 | A | * | 7/2007 |
| JP | 2017132326 | A | | 8/2017 |

* cited by examiner

VEHICLE WITH CENTER UNIT AND FRAME RAILS

PRIORITY APPLICATIONS

The present application claims priority to European Patent Application No. 22204878.7, filed on Nov. 1, 2022, and entitled "VEHICLE," which is incorporated herein by reference in its entirety.

TECHNICAL FIELD

The disclosure relates generally to a vehicle. In particular aspects, the disclosure relates to vehicle comprising a center unit, a first frame rail and a second frame rail. The disclosure can be applied in heavy-duty vehicles, such as trucks, buses, and construction equipment. Although the disclosure may be described with respect to a particular vehicle, the disclosure is not restricted to any particular vehicle.

BACKGROUND

A vehicle, for example a truck, may comprise a center unit, a first frame rail and a second frame rail. The first frame rail and the second frame rail may be connected to each other via the center unit. Generally, the first frame rail and the second frame rail may be adapted to absorb impact energy in the event that the vehicle would be involved in an impact situation, such as a collision. In order to absorb energy, the frame rails may deform during an impact situation. However, there is a risk that the rails are excessively deformed during an impact situation such that a load path in the frame rails is lost whereby the rails cannot absorb more energy. Such a scenario may result in undesirably large loads being imparted on the center unit.

SUMMARY

According to a first aspect of the disclosure, there is provided a vehicle that comprises a center unit, a first frame rail and a second frame rail.

The vehicle has a vehicle longitudinal extension in a vehicle longitudinal direction, a vehicle transversal extension in a vehicle transversal direction and a vehicle vertical extension in a vehicle vertical direction. The vehicle longitudinal direction corresponds to an intended direction of travel of the vehicle when travelling straight ahead. The vehicle vertical direction corresponds to a direction of a normal to a planar surface supporting the vehicle and the vehicle transversal direction being perpendicular to each one of the vehicles longitudinal direction and the vehicle vertical direction. The vehicle further comprises a center plane extending in the vehicle longitudinal direction and in the vehicle vertical direction and being located in the transversal center of the vehicle.

The first frame rail and the second frame rail are located on opposite sides of the center plane and the center unit is located at least partially between the first frame rail and the second frame rail in the transversal direction.

The vehicle comprises a connector being connected to a first anchor portion of the vehicle and to a second anchor portion of the vehicle and extending between the first anchor portion and the second anchor portion. The first anchor portion is rigidly connected to the first frame rail and the second anchor portion is rigidly connected to the center unit or to the second frame rail.

The vehicle has an initial state with an initial distance between the first anchor portion and the second anchor portion. The vehicle is also adapted to assume a deformed state with a deformed distance between the first anchor portion and the second anchor portion, the deformed distance being greater than the initial distance.

The connector has an initial tensile stiffness in a direction between the first anchor portion and the second anchor portion when the vehicle is in the initial state. The connector has a deformed tensile stiffness in a direction between the first anchor portion and the second anchor portion when the vehicle is in the deformed state. The initial tensile stiffness is smaller than the deformed tensile stiffness.

The first aspect of the disclosure may seek to at least limit the deformation of at least the first frame rail in the event of e.g., a collision. A technical benefit may include that a deformation of at least the first frame rail may be limited such that the energy that can be absorbed by the first frame rail can be appropriately high. This in turn may imply appropriate collision mitigation characteristics of the vehicle. Further, the feature that the initial tensile stiffness is smaller than the deformed tensile stiffness implies that the connector need not excessively contribute to the stiffness of the vehicle in the initiate state, which initial state may for instance relate to a state during normal operating conditions of the vehicle. As such, when the vehicle is in the initial state, characteristics of the vehicle such as natural frequencies and the like may be affected only to a limited extent by the connector.

In some examples, a ratio between the initial tensile stiffness and the deformed tensile stiffness may be less than 0.1, preferably less than 0.01. A technical benefit may include that the connector may have appropriate deformation limitation characteristics and that the connector need not excessively influence the characteristics of the vehicle when in the initial condition.

In some examples, the vehicle has a vehicle deadweight, a tensile strength of the connector in a direction between the first anchor portion and the second anchor portion may be less than 300%, preferably less than 200%, more preferred less than 100%, of the vehicle deadweight.

In some examples, the vehicle has a vehicle deadweight, a tensile strength of the connector in a direction between the first anchor portion and the second anchor portion may be greater than 10%, preferably greater than 20%, more preferred greater than 30%, of the vehicle deadweight. A technical benefit may include that the connector may have appropriate deformation limitation characteristics.

In some examples, the connector has a load transmitting ratio between a maximum tensile load transmittable via the connector and a maximum compression load transmittable via the connector. The load transmitting ratio may be at least 50, preferably at least 100. A technical benefit may include that the connector may have appropriate deformation limitation characteristics as well as an appropriately low influence of the characteristics of the vehicle in the initial state.

In some examples, the connector comprises, preferably is constituted by, a cable. A technical benefit may include providing a cost efficient implementation of the connector.

In some examples, the cable is slacked in the initial state. A technical benefit may include providing an appropriately low influence of the characteristics of the vehicle in the initial state.

In some examples, the connector comprises a first connector portion connected to the first anchor portion and second connector portion connected to the second anchor portion. The connector may be such that:

the first connector portion and the second connector portion are separated by an initial separation distance when the vehicle is in the initial state, and the first connector portion and the second connector portion are separated by a deformed separation distance when the vehicle is in the deformed state, wherein a ratio between the deformed separation distance and the initial separation distance is less than 0.5, preferably less than 0.1. A technical benefit may include that the connector may have appropriate deformation limitation characteristics as well as an appropriately low influence of the characteristics of the vehicle in the initial state. It should be noted that the above technical benefit may be obtained even if the connector comprises relatively rigid members.

In some examples, the connector comprises a first connector portion connected to the first anchor portion and second connector portion connected to the second anchor portion. The first connector portion and the second connector portion may be adapted to assume a disengaged condition, in which the first connector portion is spaced from the second connector portion, when the vehicle is in the initial state. The first connector portion and the second connector portion may be adapted to assume an engaged condition, in which the first connector portion and the second connector portion are in contact, when the vehicle is in the deformed state. A technical benefit may include that the connector may have appropriate deformation limitation characteristics as well as an appropriately low influence of the characteristics of the vehicle in the initial state. It should be noted that the above technical benefit may be obtained even if the connector comprises relatively rigid members.

In some examples, the connector can only transfer a load between the first anchor portion and the second anchor portion when the first connector portion and the second connector portion assume the engaged condition. In other words, the connector has a non-zero tensile stiffness only when the first connector portion and the second connector portion assume the engaged condition. A technical benefit may include that the connector may have appropriate deformation limitation characteristics as well as an appropriately low influence of the characteristics of the vehicle in the initial state. Here, it should be noted that the above-mentioned characteristic as regards the load transfer implies that the connector may be installed in a straightforward manner since the first connector portion and the second connector portion need not be in contact during the installation.

In some examples, the first connector portion is connected to the first anchor portion via a first connector arm, preferably the first connector arm is made of metal, such as steel. Moreover, the second connector portion is connected to the second anchor portion via a second connector arm, preferably the second connector arm is made of metal, such as steel. A technical benefit may include that the connector comprises relatively rigid parts that are straightforward to assemble.

In some examples, the first connector portion and the first connector arm form a unitary component and the second connector portion and the second connector arm form a unitary component. A technical benefit may include that the connector comprises an appropriately low number of components, making the connector that are straightforward to assemble.

In some examples, one of the first connector portion and the second connector portion at least forms part of a connector loop enclosing a connector portion area. The other one of the first connector portion and the second connector portion extends into the connector portion area at least when the first connector portion and the second connector portion assume the disengaged condition. A technical benefit may include that a relatively compact connector may be obtained.

In some examples, the connector may form an angle having an absolute value that may be in the range of 0°-70°, with a transversal plane extending in the transversal direction and in the vertical direction. A technical benefit may include that the connector may have appropriate deformation limitation characteristics.

In some examples, the connector may form an angle having an absolute value that may be in the range of 30°-70°, preferably in the range of 40°-60°, with a transversal plane extending in the transversal direction and in the vertical direction. A technical benefit may include that the connector may have appropriate deformation limitation characteristics.

In some examples, the connector may form an angle having an absolute value that may be in the range of 0°-20° with a transversal plane extending in the transversal direction and in the vertical direction. A technical benefit may include that the connector may have appropriate deformation limitation characteristics.

In some examples, a distance difference between the deformed distance and the initial distance may be greater than 2 mm, preferably greater than 5 mm, more preferred greater than 10 mm. A technical benefit may include that the deformed tensile stiffness is obtained after the above-mentioned distance difference has been obtained which in turn may imply that appropriate deformation limitation characteristics are obtained but that the connector still may have an appropriately low influence of the characteristics of the vehicle in the initial state.

In some examples, a distance difference between the deformed distance and the initial distance may be smaller than 25 mm, preferably smaller than 20 mm. A technical benefit may include that the deformed tensile stiffness is obtained after the above-mentioned distance difference has been obtained which in turn may imply that appropriate deformation limitation characteristics are obtained but that the connector still may have an appropriately low influence of the characteristics of the vehicle in the initial state.

In some examples, the first frame rail is located further from the center plane in the deformed state than in the initial state.

In some examples, the vehicle may comprise an electric motor for propelling the vehicle. The center unit may comprise a battery assembly for supplying electric energy to the electric motor.

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein.

BRIEF DESCRIPTION OF THE DRAWINGS

With reference to the appended drawings, below follows a more detailed description of aspects of the disclosure cited as examples.

DETAILED DESCRIPTION

Aspects set forth below represent the necessary information to enable those skilled in the art to practice the disclosure.

Figure 1:
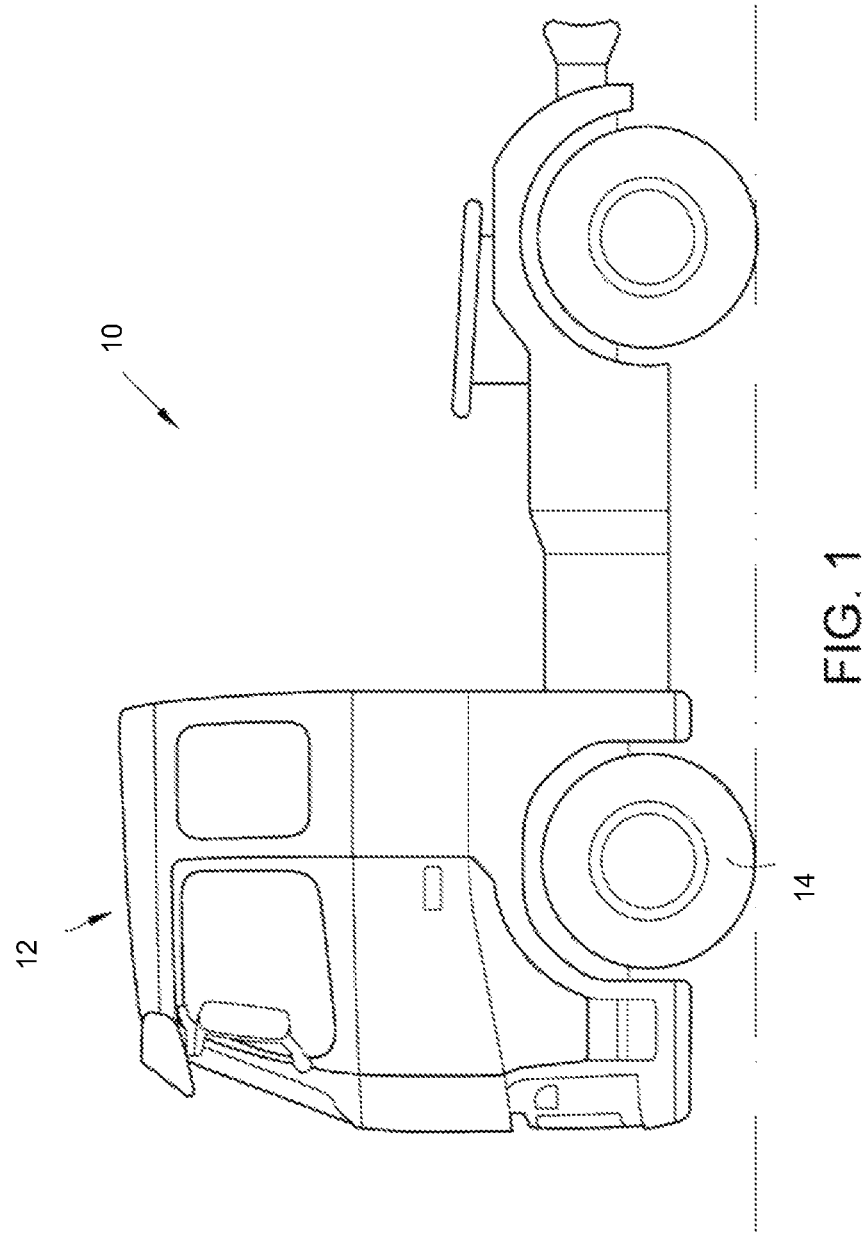
FIG. 1 is a schematic illustration of a vehicle.

FIG. 1 illustrates a vehicle 10, in accordance with at least one exemplary embodiment of the invention. Although the vehicle 10 is illustrated in the form of a truck, other types of vehicles, such as buses, construction equipment, trailers or passenger cars may be provided in accordance with the invention. Purely by way of example, the vehicle 10 may comprise a cab 12 in which a driver may operate the vehicle 10. Moreover, as a non-limiting example, the vehicle 10 may comprise a number of ground engaging members, exemplified as wheels 14 in FIG. 1.

Figure 2:
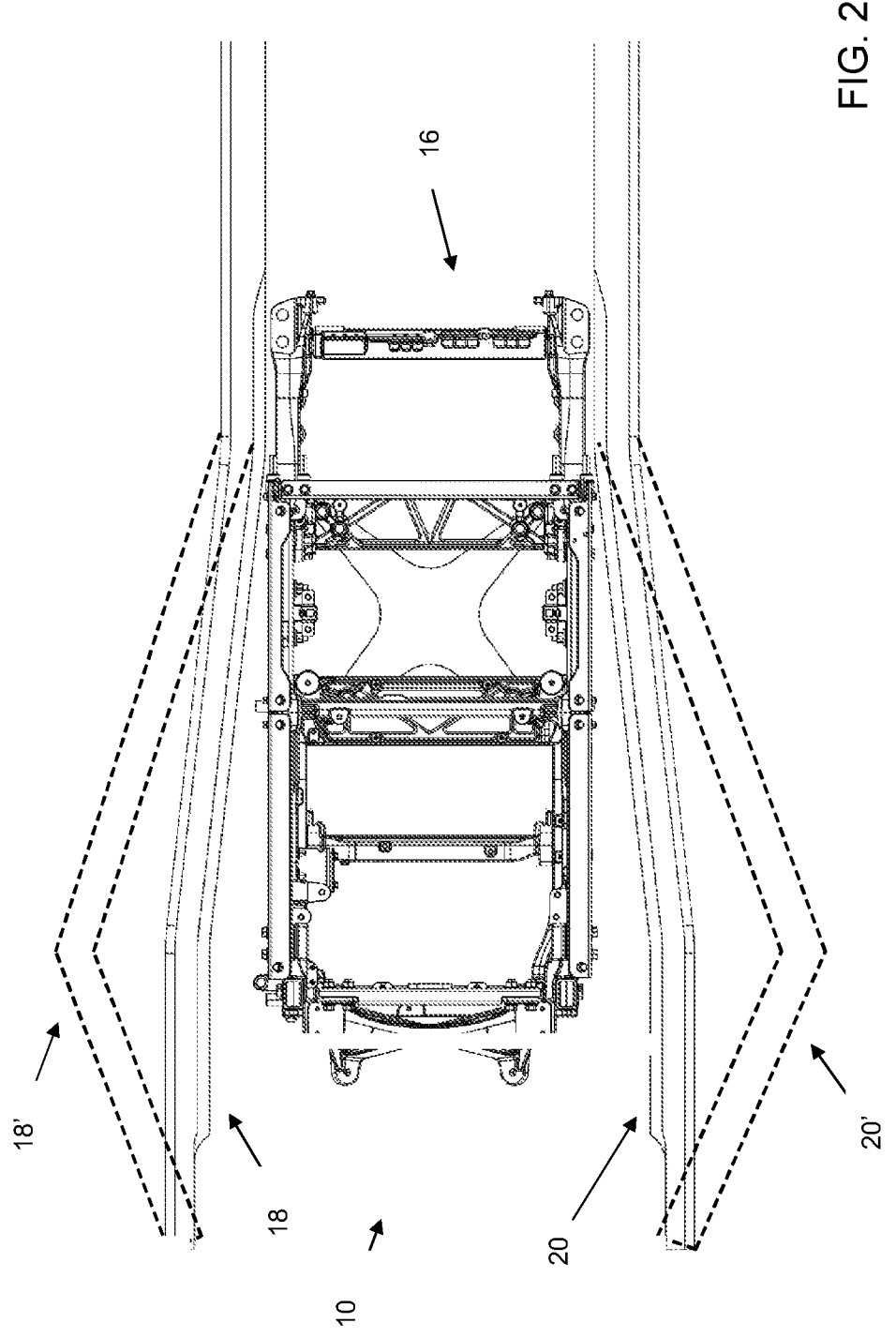
FIG. 2 is a schematic illustration of a portion of a vehicle.

FIG. 2 illustrates a portion of a vehicle 10 which does not necessarily fall within the scope of the appended claims. The FIG. 2 vehicle 10 comprises a center unit 16, a first frame rail 18 and a second frame rail 20. As indicated by the dashed lines in FIG. 2, in the event of a collision, such as a forward collision, the frame rails 18', 20' may be deformed to a large extent. When the frame rails 18', 20' are excessively deformed, there is a risk that a load path in the rails 18', 20' is lost such that the rails 18', 20' cannot absorb more energy. This may result in undesirably large loads being imparted on the center unit 16 and/or other components of the vehicle 10.

Figure 3:
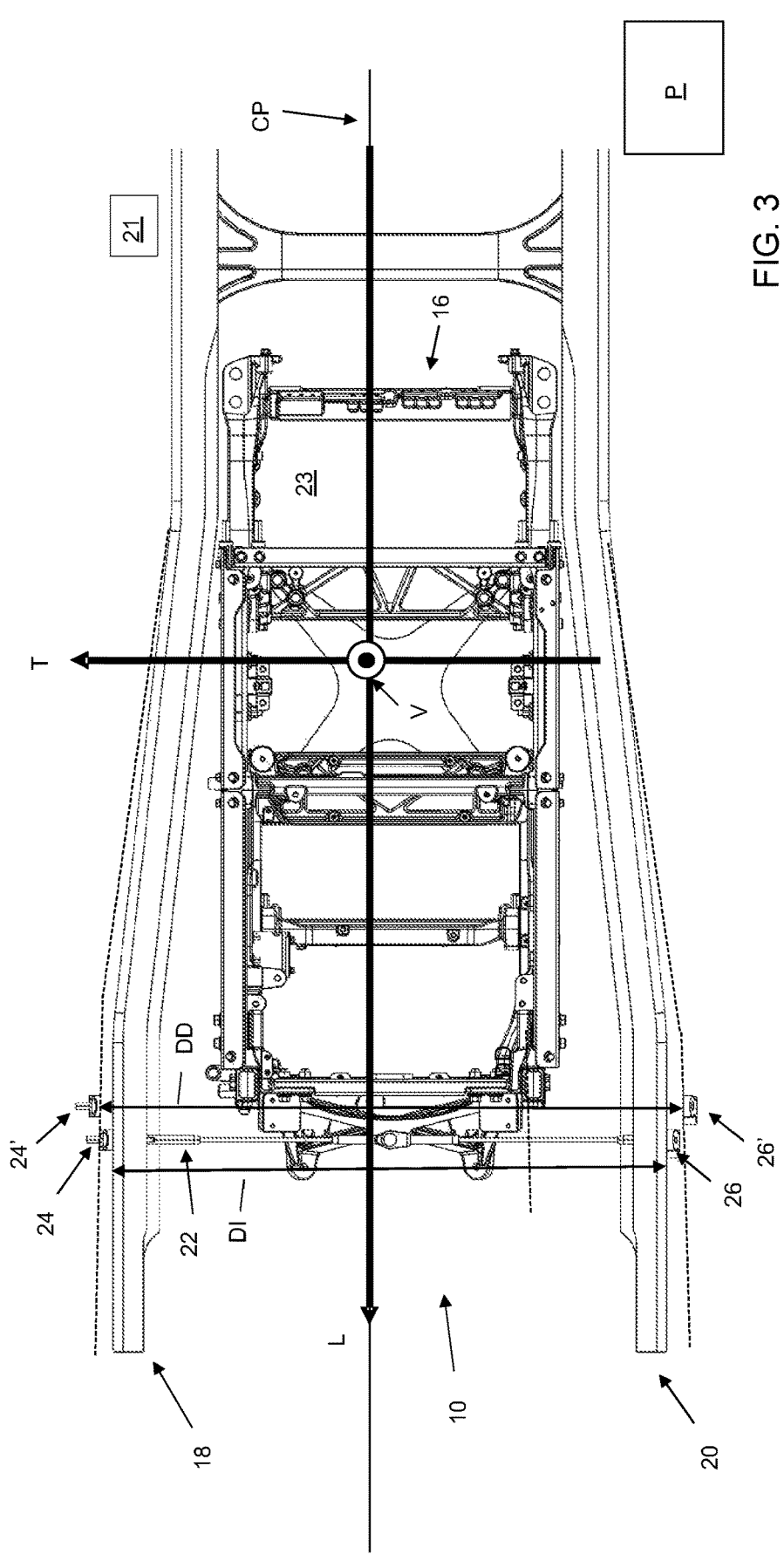
FIG. 3 is an exemplary portion of a vehicle.

FIG. 3 illustrates a portion of an example of a vehicle 10. As may be gleaned from FIG. 3, the vehicle 10 comprises a center unit 16, a first frame rail 18 and a second frame rail 20. In some examples, the vehicle 10 may comprise an electric motor 21 for propelling the vehicle 10. The center unit 16 may comprise a battery assembly 23 for supplying electric energy to the electric motor 21. However, it is also envisaged that other examples of a vehicle may comprise another type of assembly for propelling the vehicle, such as an internal combustion engine (not shown).

Moreover, as also indicated in FIG. 3, the vehicle 10 has a vehicle longitudinal extension in a vehicle longitudinal direction L, a vehicle transversal extension in a vehicle transversal direction T and a vehicle vertical extension in a vehicle vertical direction V. The vehicle longitudinal direction L corresponds to an intended direction of travel of the vehicle 10 when travelling straight ahead. Moreover, the vehicle vertical direction V corresponds to a direction of a normal to a planar surface P supporting the vehicle 10 and the vehicle transversal direction T is perpendicular to each one of the vehicle longitudinal direction L and the vehicle vertical direction V. The vehicle 10 further comprises a center plane CP extending in the vehicle longitudinal direction L and in the vehicle vertical direction V and being located in the transversal center of the vehicle 10.

The first frame rail 18 and the second frame rail 20 are located on opposite sides of the center plane CP and the center unit 16 is located at least partially between the first frame rail 18 and the second frame rail 20 in the transversal direction T.

As indicated in FIG. 3, the vehicle 10 comprises a connector 22 being connected to a first anchor portion 24 of the vehicle 10 and to a second anchor portion 26 of the vehicle 10 and extending between the first anchor portion 24 and the second anchor portion 26. The first anchor portion 24 is rigidly connected to the first frame rail 18 and the second anchor portion 26 is rigidly connected to the center unit 16 or to the second frame rail 20. In the example illustrated in FIG. 3, the anchor portion 26 is rigidly connected to the second frame rail 20.

The vehicle 10 has an initial state with an initial distance DI between the first anchor portion 24 and the second anchor portion 26. The vehicle 10 is also adapted to assume a deformed state—as indicated by the dashed lines in FIG. 3—with a deformed distance DD between the first anchor portion 24 and the second anchor portion 26, the deformed distance DD being greater than the initial distance DI. In an attempt to simplify a study of FIG. 3, the positions of the anchor portions 24', 26' in the deformed state are located at a distance in the longitudinal direction L from the distance of the anchor portions 24, 26 in the initial state. However, it is also contemplated that the positions of the anchor portions 24', 26' in the deformed state may substantially correspond to the positions of the anchor portions 24, 26 in the initial state in the longitudinal direction L.

As used herein, the term "distance" refers to the Euclidean distance between two points. As such, for a first point $p_1$ with coordinates $(L_1, T_1, V_1)$ and second point $p_2$ with coordinates $(L_2, T_2, V_2)$, the distance between the two points can be determined in accordance with the following equation:

$$D = \sqrt{(L_1-L_2)^2+(T_1-T_2)^2+(V_1-V_2)^2}$$

Furthermore, the connector 22 has an initial tensile stiffness ITS in a direction between the first anchor portion 24 and the second anchor portion 26 when the vehicle 10 is in the initial state. Additionally, the connector 22 has a deformed tensile stiffness DTS in a direction between the first anchor portion 24 and the second anchor portion 26 when the vehicle 10 is in the deformed state. The initial tensile stiffness ITS is smaller than the deformed tensile stiffness DTS.

As will be elaborated on hereinbelow, the fact that the initial tensile stiffness ITS is smaller than the deformed tensile stiffness DTS can be achieved in a plurality of different ways, e.g., using flexible elements such as cables, relative rigid elements, or a combination thereof.

Figure 4:
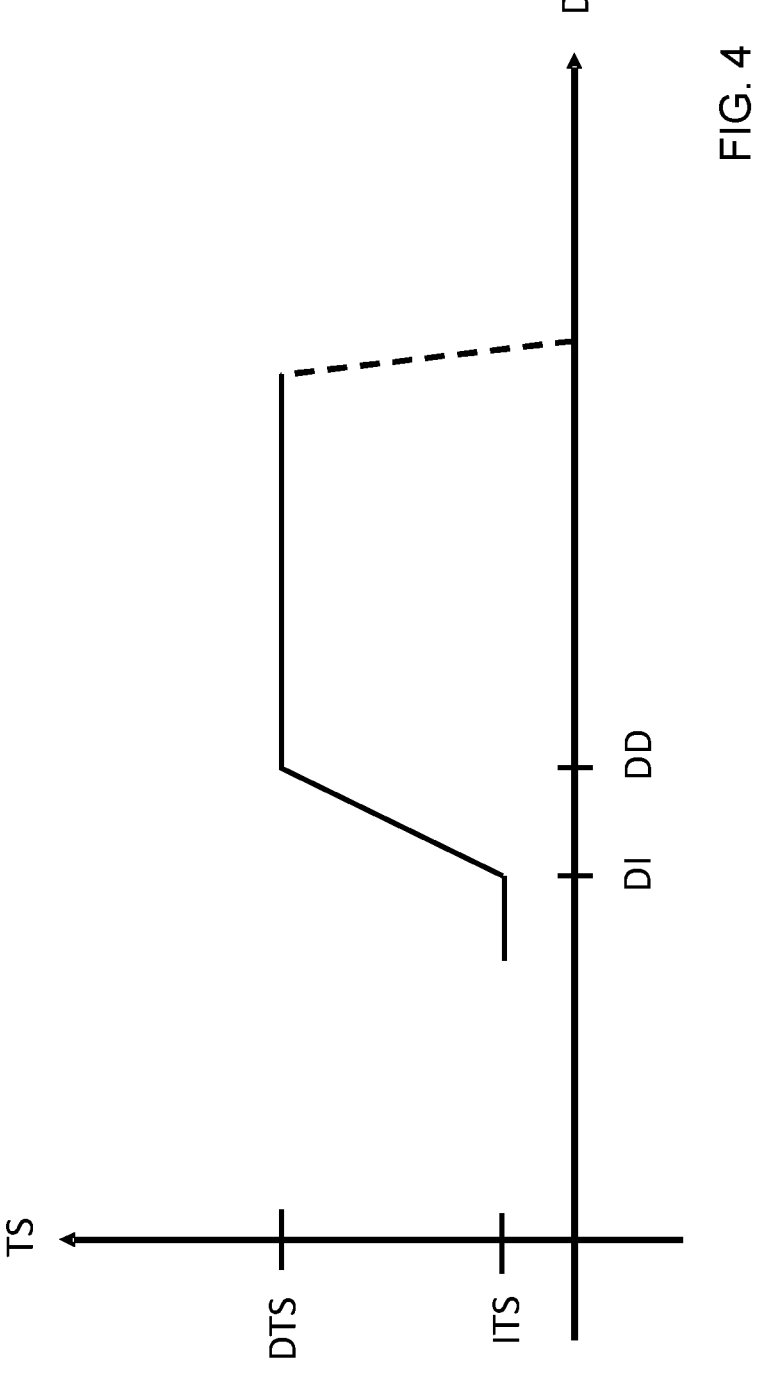
FIG. 4 is an exemplary diagram of a tensile stiffness.

The above characteristics of the connector 22 will now be explained with reference to the example illustrated in FIG. 4. FIG. 4 illustrates a diagram the abscissa of which represents the distance D between the first anchor portion (not shown in FIG. 4) and the second anchor portion (not shown in FIG. 4). Moreover, the ordinate in FIG. 4 represents the tensile stiffness TS in a direction between the first anchor portion (not shown in FIG. 4) and the second anchor portion (not shown in FIG. 4).

As used herein, the term "tensile stiffness" TS in a direction between the first anchor portion and the second anchor portion relates to the ability of the connector 22 to return to its original form when the distance between the first anchor portion and the second anchor portion is increased. As a non-limiting example, the term tensile stiffness TS may be defined as the ratio between a restoring load and an increase in the distance between the two anchor portions. As such, the term tensile stiffness may have the unit N/m, kN/m or an equivalent thereof.

As may be realized from FIG. 4, when the distance D corresponds to the initial distance DI, the connector 22 has an initial tensile stiffness ITS and when the distance D corresponds to the deformed distance DD, the connector 22 has a deformed tensile stiffness DTS. As indicated above and as also is discernible from FIG. 4, the initial tensile stiffness ITS is smaller than the deformed tensile stiffness DTS. As such, the connector 22 is not such that it has the same stiffness for the two distances DI, DD. Instead, the connector is such that there is an increase in tensile stiffness when going from the initial distance DI to the deformed distance DD. In the non-limiting example illustrated in FIG. 4, the tensile stiffness increase from the initial distance DI to the deformed distance DD follows a ramp function, such a linear ramp function, but it is of course also contemplated that the tensile stiffness increase from the initial distance DI to the deformed distance DD may follow another type of function, such as a step function.

Moreover, in the schematic example illustrated in FIG. 4, the tensile stiffness is substantially constant for distances D exceeding the deformed distance DD. However, it is also contemplated that the connector 22 may be such that the tensile stiffness varies as a function of the distance for distances D exceeding the deformed distance DD. As a non-limiting example, the connector 22 may be such that the tensile stiffness increases as a function of the distance for distances D exceeding the deformed distance DD. Moreover, as indicated by the dashed line in FIG. 4, the connector 22 may rupture at a certain distance, resulting in that the tensile stiffness decreases towards zero.

Irrespective of which unit of the tensile stiffness that is used, values of the tensile stiffness for a connector 22 may be determined in a plurality of different ways.

As a first non-limiting example, a numerical model, such as a finite element model (FEM), may be generated for at least the connector 22. Moreover, input to the model of the connector 22 may be such that the initial distance DI is obtained between the first anchor portion 24 and the second anchor portion 26. When in such a condition, input may be issued to the model to increase the distance between the first anchor portion 24 and the second anchor portion 26 by a relatively small first increment. The resulting counteracting force, i.e., the increase in counteracting force when going from the initial distance DI to the initial distance DI plus the first increment, generated by the connector 22 may be determined and the initial tensile stiffness ITS may be determined by calculating the ratio between the resulting counteracting force and the magnitude of the first increment. Moreover, input may be issued to the model to increase the distance between the first anchor portion 24 and the second anchor portion 26 such that the deformed distance DD is obtained between the first anchor portion 24 and the second anchor portion 26. When in such a condition, input may be issued to the model to increase the distance between the first anchor portion 24 and the second anchor portion 26 by a relatively small second increment. The resulting counteracting force, i.e., the increase in counteracting force when going from the deformed distance DD to the deformed distance DD plus the second increment, generated by the connector 22 may be determined and the deformed tensile stiffness DTS may be determined by calculating the ratio between the resulting counteracting force and the magnitude of the second increment. For the sake of completeness, it should be noted that the above exemplary procedure does not require that the first increment equals the second increment although it is of course also possible that the first increment equals, or substantially equals, the second increment.

As a second non-limiting example, a connector 22 may be arranged in a test bench (not shown) such that a first portion of the connector 22, which first portion corresponds to the intended position of the first anchor portion 24, is connected to a first portion of the test bench and such that a second portion of the connector 22, which second portion corresponds to the intended position of the second anchor portion 26, is connected to a second portion of the test bench. The first portion of the test bench may be movable relative to the second portion of the test bench. When the connector 22 is connected to the test bench in the manner described above and when the distance between the two portions of the test bench is at least an equivalent of the initial distance DI, the first portion of the test bench may be imparted a movement relative to the second portion of the test bench such that the distance between the two portions increases by a first increment and a resulting counteracting force may be determined using e.g. a load sensor. The initial tensile stiffness ITS may be determined by calculating the ratio between the resulting counteracting force, i.e., the increase in counteracting force when going from the initial distance DI to the initial distance DI plus the first increment, and the magnitude of the first increment. Moreover, the above procedure may also comprise alternating the distance between the two portions of the test bench such that the distance is at least an equivalent of the deformed distance DD and the first portion of the test bench may be imparted a movement relative to the second portion of the test bench such that the distance between the two portions increases by a second increment and a resulting counteracting force, i.e. the increase in counteracting force when going from the deformed distance DD to the deformed distance DD plus the second increment, may be determined using e.g. a load sensor. The deformed tensile stiffness DTS may be determined by calculating the ratio between the resulting counteracting force and the magnitude of the second increment. For the sake of completeness, it should be noted that the above exemplary procedure does not require that the first increment equals the second increment although it is of course also possible that the first increment equals, or substantially equals, the second increment.

Each one of the exemplary procedures above have been presented such that the procedure for determining the initial tensile stiffness ITS is presented before the procedure for determining the deformed tensile stiffness DTS. However, it is also contemplated that the alternative procedures for determining the tensile stiffnesses may employ another temporal order, for instance determining the deformed tensile stiffness DTS before the initial tensile stiffness ITS. Moreover, it is further envisaged that alternative procedures need not only model or test the connector 22 alone.

Irrespective of how the initial tensile stiffness ITS and the deformed tensile stiffness DTS are determined, purely by way of example, a ratio between the initial tensile stiffness ITS and the deformed tensile stiffness DTS may be less than 0.1, preferably less than 0.01. As non-limiting examples, a ratio between the initial tensile stiffness ITS and the deformed tensile stiffness DTS may be achieved in a plurality of different ways as will be elaborated on hereinbelow.

In some examples, the vehicle 10 has a vehicle deadweight, a tensile strength of the connector 22 in a direction between the first anchor portion 24 and the second anchor portion 26 may be less than 300%, preferably less than 200%, more preferred less than 100%, of the vehicle deadweight. As used herein, the term "tensile strength" relates to the resistance of the connector 22 to breaking under tension. When relating the tensile strength to the vehicle deadweight, the tensile strength and the vehicle deadweight may preferably be defined using the same unit, such as N. As a non-limiting example, assuming that the vehicle deadweight is 10 metric tons and that the tensile strength is 50 kN, the tensile strength is 50 000/(10 000*9.81)=51% of the vehicle deadweight. As non-limiting examples, the tensile strength may be determined using a numerical procedure or a test procedure similar to any one of the procedures outlined hereinabove for determining the tensile stiffness. Moreover, the vehicle deadweight may be determined using e.g., a scale for a vehicle, alternatively the vehicle deadweight may be determined by consulting vehicle information provided by the manufacturer or sales organization of the vehicle. A tensile strength of the connector being below any one of the above limits may be achieved by combination of material thickness and material design of at least a portion of the connector 22.

In some examples, the vehicle 10 has a vehicle deadweight, a tensile strength of the connector 22 in a direction between the first anchor portion 24 and the second anchor portion 26 may be greater than 10%, preferably greater than 20%, more preferred greater than 30%, of the vehicle deadweight. Again, a tensile strength of the connector being above any one of the above limits may be achieved by combination of material thickness and material design of at least a portion of the connector 22.

In some examples, the connector 22 has a load transmitting ratio between a maximum tensile load transmittable via the connector 22 and a maximum compression load transmittable via the connector 22. The load transmitting ratio may be at least 50, preferably at least 100.

In some examples, the connector 22 may comprise, preferably may be constituted by, a cable. In some examples, the cable is slacked in the initial state.

Figure 5:
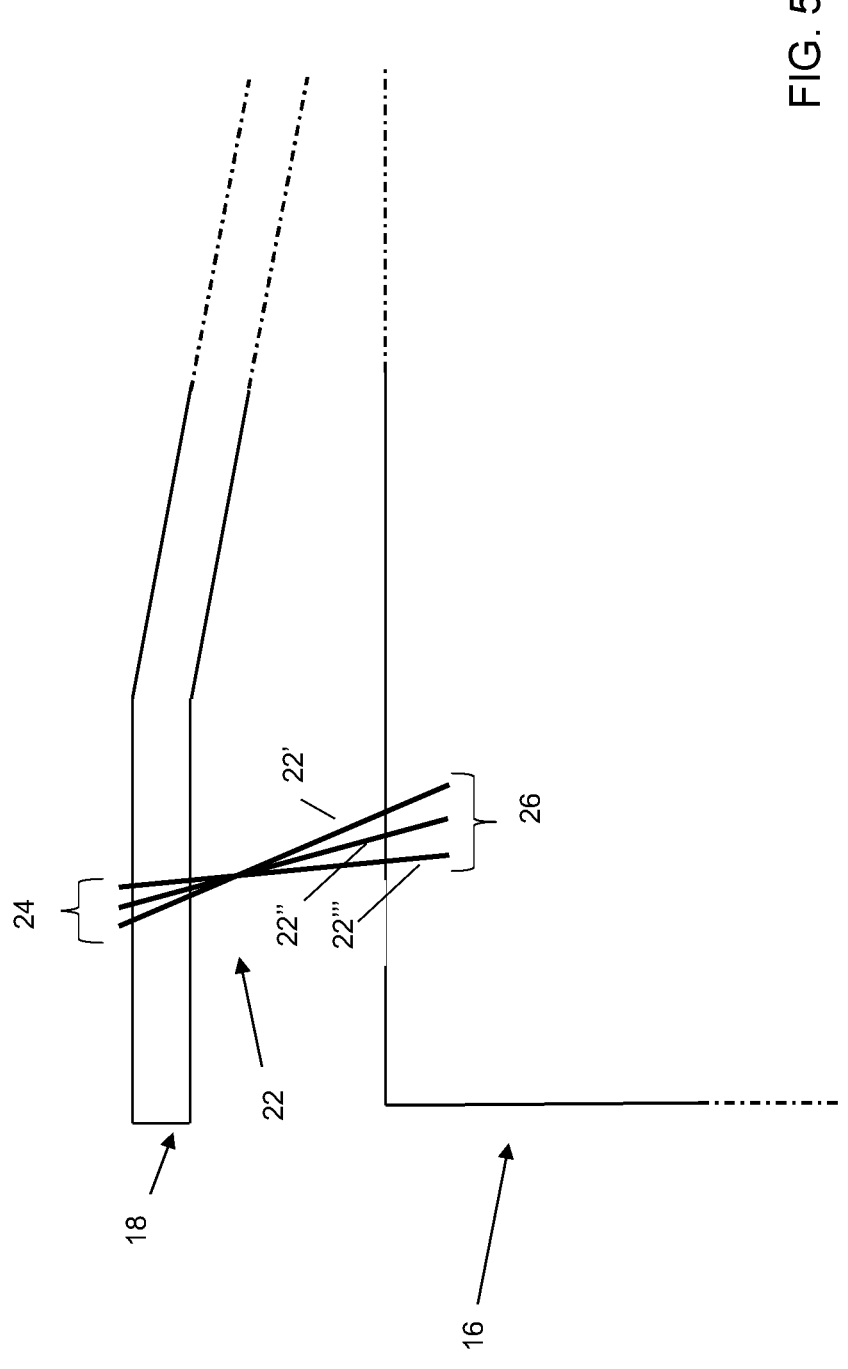
FIG. 5 is an exemplary portion of a vehicle.

It should also be noted that examples of the connector 22 may comprise a plurality of connector elements 22', 22", 22'''. To this end, reference is made to FIG. 5 illustrating an example in which the connector 22 comprises three connector elements 22', 22", 22''' although it is envisaged that any number of connector elements may be used. Each one of the connector elements 22', 22", 22''' extends from a first anchor portion 24 to a second anchor portion 26. In the example illustrated in FIG. 5, the first anchor portion 24 is rigidly connected to a first frame rail 18 and the second anchor portion 26 is rigidly connected to a center unit 16. However, it is also envisaged that the second anchor portion 26 may be rigidly connected to a second frame rail (not shown in FIG. 5). Moreover, as exemplified in FIG. 5, the connector elements 22', 22", 22''' need not necessarily be parallel to each other. Each one of the connector elements 22', 22", 22''' may contribute to any one of the characteristics mentioned above, such as the tensile stiffness and/or the tensile strength.

Purely by way of example, when the connector 22 comprises a plurality of connector elements 22', 22", 22''', the position of the first anchor portion 24 may be determined so as to equal the average position at which each connector element 22', 22", 22''' is rigidly connected to the first frame rail 18. Thus, as a non-limiting example, if a connector 22 comprises n connector elements and each connector element is rigidly connected to the first frame rail 18 at a longitudinal position $L_i$, the longitudinal position of the first anchor portion 24 may be set so as to equal:

$$\left(\sum_{i=1}^{n} L_i\right)\Big/ n.$$

The same procedure can be employed for the transversal direction T and the vertical direction V, respectively. Moreover, the above procedure may also be employed for determining the position of the second anchor portion 26. As a non-limiting example, the extension of the connector 22 may be determined using the position of the first anchor portion 24 and the second anchor portion 26, respectively, which have been determined in accordance with procedure mentioned above in this paragraph.

Figures 6A, 6B, 6C:
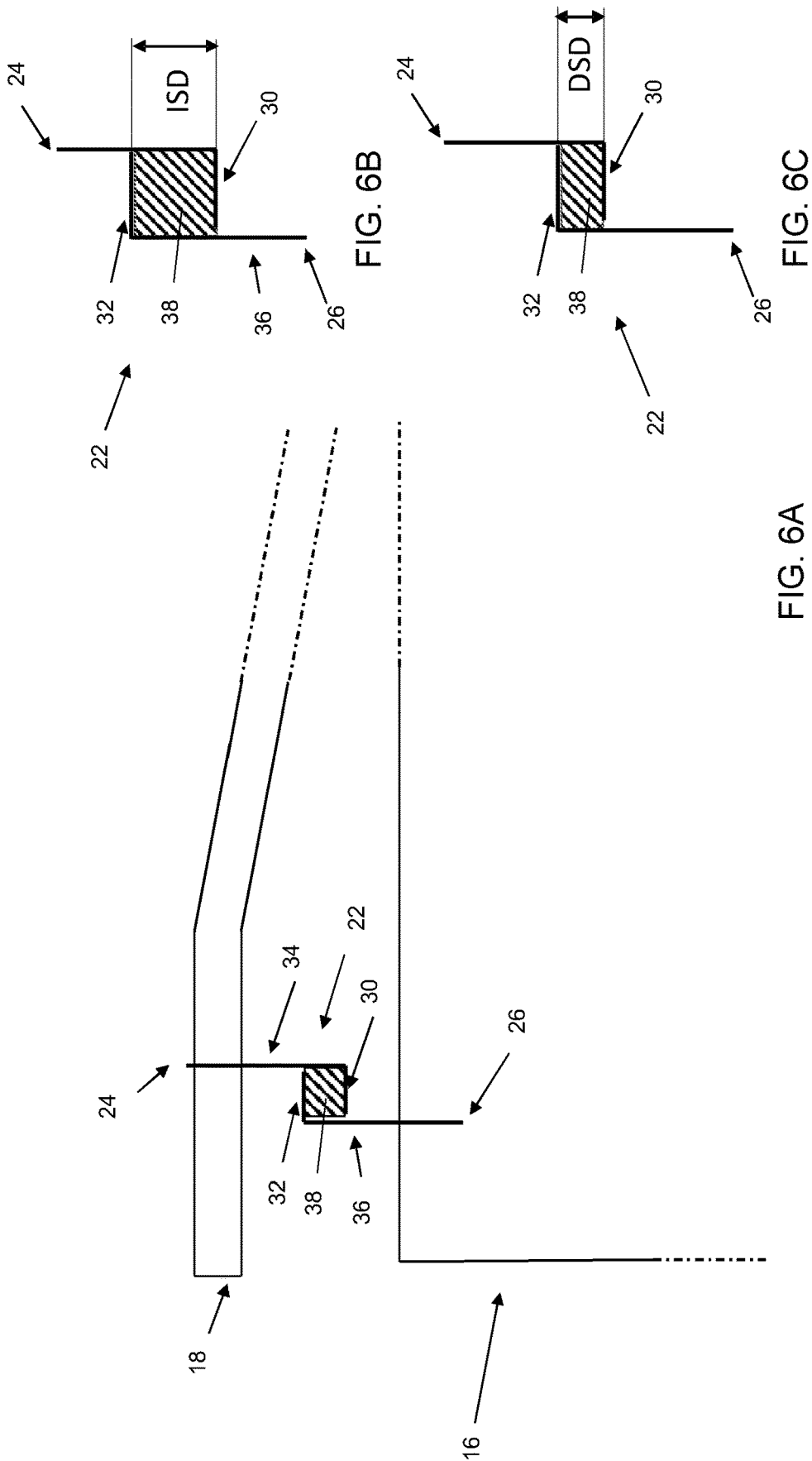
FIGS. 6A-6C illustrate an exemplary portion of a vehicle.

Although the above examples are presented using a cable or a similar component as a non-limiting implementation of the connector 22, it is also envisaged that examples may comprise other components instead of, or in addition to, one or more cables. To this end, reference is made to FIG. 6A illustrating an example in which the connector 22 comprises a first connector portion 30 connected to the first anchor portion 24 and second connector portion 32 connected to the second anchor portion 26. Purely by way of example, the first connector portion 30 may be connected to the first anchor portion 24 via a first connector arm 34 which for instance may be made of metal, such as steel. In a similar vein, though purely by way of example, the first connector portion 30 may extend in a direction forming an angle with the first connection arm and the first connector portion 30 may also be made of metal, such as steel. The first connector portion 30 and the first connector arm 34 may be formed as a unitary component, alternatively, the first connector portion 30 and the first connector arm 34 may be connected together using e.g. a weld joint (not shown). Purely by way of example, the second connector portion 32 may be connected to the second anchor portion 26 via a second connector arm 36 which for instance may be made of metal, such as steel. In a similar vein, though purely by way of example, the second connector portion 32 may extend in a direction forming an angle with the second connector arm and the second connector portion 32 may also be made of metal, such as steel. The second connector portion 32 and the second connector arm 36 may be formed as a unitary component, alternatively, the second connector portion 32 and the second connector arm 36 may be connected together using e.g., a weld joint (not shown). Moreover, in the FIG. 6A example, the connector 22 also comprises a load transmitter 38 located at least partially between the first connector portion 30 and the second connector portion 32. As a non-limiting example, the load transmitter 38 may be made of a material having a modulus of elasticity being lower than, e.g., less than half of, the modulus of elasticity of the material forming the first connector portion 30. Purely by way of example, the load transmitter 38 may comprise or be constituted by a rubber element. As another non-limiting example, the load transmitter 38 may comprise a resilient member, such as a spring (now shown).

FIGS. 6B and 6C illustrate a portion of the FIG. 6A example. FIG. 6B illustrates the portion when the vehicle (not shown) is in the initial state. As may be gleaned from FIG. 6B, the first connector portion 30 and the second connector portion 32 are separated by an initial separation distance ISD when the vehicle is in the initial state. FIG. 6C illustrates the portion when the vehicle is in the deformed state. As may be gleaned from FIG. 6C, the first connector portion 30 and the second connector portion 32 are separated by a deformed separation distance ISD when the vehicle is in the deformed state.

As may be realized from FIG. 6C, the load transmitter 38 may be compressed when the vehicle is in the deformed state and the relative movement between the first connector portion 30 the second connector portion 32 may be such that the first connector portion 30 and the second connector portion 32 move towards each other. Purely by way of example, a ratio between the deformed separation distance DSD and the initial separation distance ISD may be less than 0.5, preferably less than 0.1. When the first connector portion 30 and the second connector portion 32 are separated by the deformed separation distance ISD as indicated in FIG. 6C, the deformed tensile stiffness DTS may be significantly larger than the initial tensile stiffness ITS. As non-limiting examples, the connector 22 may have a ratio between the initial tensile stiffness ITS and the deformed tensile stiffness DTS which is less than 0.1, preferably less than 0.01.

Figures 7A, 7B, 7C:
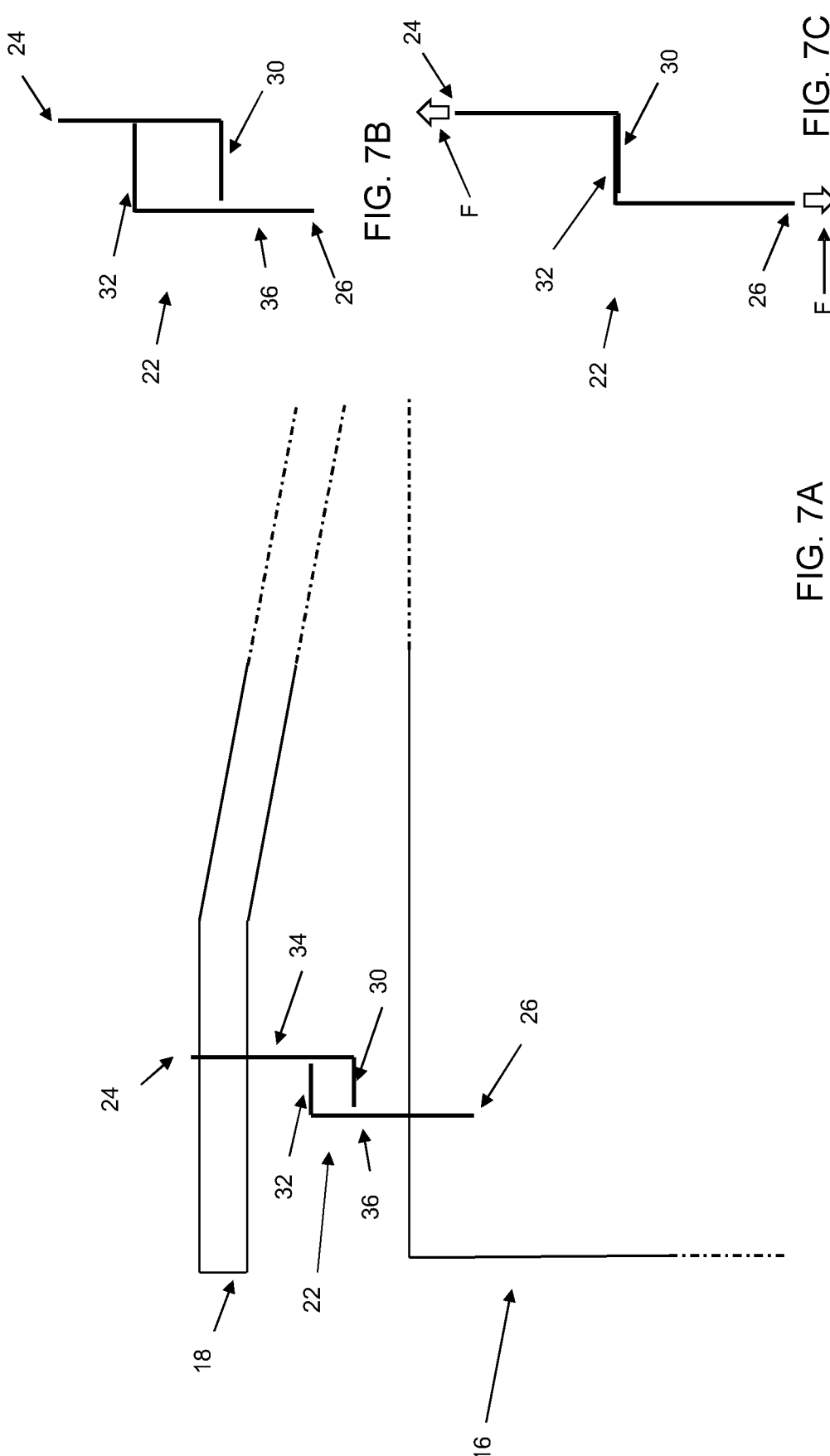
FIGS. 7A-7C illustrate an exemplary portion of a vehicle.

With reference to FIGS. 7A-7C, in some examples, the connector 22 may comprise a first connector portion 30 connected to the first anchor portion 24 and second connector portion 32 connected to the second anchor portion 26. Purely by way of example, the first connector portion 30 may be connected to the first anchor portion 24 via a first connector arm 34 which for instance may be made of metal, such as steel. In a similar vein, though purely by way of example, the first connector portion 30 may extend in a direction forming an angle with the first connector arm and the first connector portion 30 may also be made of metal, such as steel. The first connector portion 30 and the first connector arm 34 may be formed as a unitary component, alternatively, the first connector portion 30 and the first connector arm 34 may be connected together using e.g. a weld joint (not shown). Purely by way of example, the second connector portion 32 may be connected to the second anchor portion 26 via a second connector arm 36 which for instance may be made of metal, such as steel. In a similar vein, though purely by way of example, the second connector portion 32 may extend in a direction forming an angle with the second connection arm and the second connector portion 32 may also be made of metal, such as steel. The second connector portion 32 and the second connector arm 36 may be formed as a unitary component, alternatively, the second connector portion 32 and the second connector arm 36 may be connected together using e.g., a weld joint (not shown).

With reference to FIG. 7B, the first connector portion 30 and the second connector portion 32 may be adapted to assume a disengaged condition, in which the first connector portion 30 is spaced from the second connector portion 32, when the vehicle is in the initial state. Moreover, with reference to FIG. 7C, the first connector portion 30 and the second connector portion 32 may be adapted to assume an engaged condition, in which the first connector portion 30 and the second connector portion 32 are in contact, when the vehicle is in the deformed state. As indicated in FIG. 7C, when the first connector portion 30 and the second connector portion 32 are in contact, the connector 22 may transfer a load F in at least a direction between the first anchor portion 24 and the second anchor portion 26. When the when the first connector portion 30 and the second connector portion 32 are in contact as illustrated in FIG. 7C, the deformed tensile stiffness DTS may be significantly larger than the initial tensile stiffness ITS which occurs when the first connector portion 30 is spaced from the second connector portion 32, see FIG. 7B. As non-limiting examples, the connector 22 may have a ratio between the initial tensile stiffness ITS and the deformed tensile stiffness DTS which is less than 0.1, preferably less than 0.01.

Figures 8A, 8B, 8C:
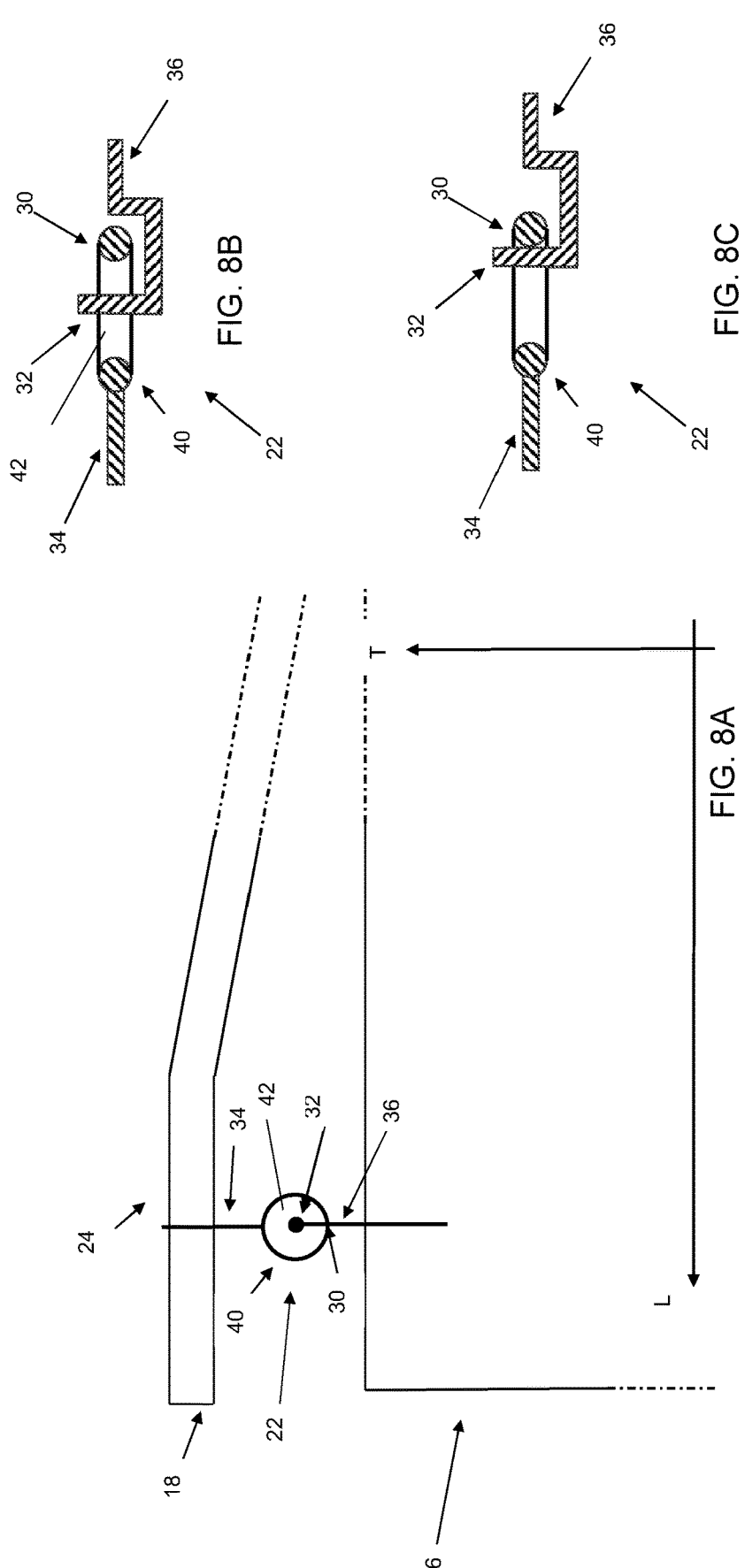
FIGS. 8A-8C illustrate an exemplary portion of a vehicle.

With reference to FIGS. 8A-8C, in some examples, one of the first connector portion 30 and the second connector portion 32 at least forms part of a connector loop 40 enclosing a connector portion area 42. The other one of the first connector portion 30 and the second connector portion 32 extends into the connector portion area 42 at least when the first connector portion 30 and the second connector portion 32 assume the disengaged condition.

In the example illustrated in FIGS. 8A-8C, the first connector portion 30 at least forms part of a connector loop 40 enclosing a connector portion area 42. To this end, reference is made to FIG. 8A illustrating an example with a connector loop 40 being substantially circular. However, it is also envisaged that the connector loop 40 may have other shapes, such as a rectangular shape (not shown). Furthermore, in the FIG. 8A example, the connector portion area 42 extends in a plane being parallel to a plane extending in the vehicle longitudinal direction L and the vehicle transversal direction T. However, it is also envisaged that in other examples, the connector portion area 42 may extend in a plane being parallel to another plane. Moreover, as indicated in e.g., each one of FIGS. 8A-8C, the second connector portion 32 extends into the connector portion area 42 at least when the first connector portion 30 and the second connector portion 32 assume the disengaged condition. In fact, in the FIGS. 8A-8C example, the second connector portion 32 extends into the connector portion area 42 when the first connector portion 30 and the second connector portion 32 assume each one of the disengaged condition and the engaged condition. Furthermore, it is also envisaged that in other examples, the second connector portion 32 at least forms part of a connector loop 40 enclosing a connector portion area 42. In such examples, the first connector portion 30 extends into the connector portion area 42 at least when the first connector portion 30 and the second connector portion 32 assume the disengaged condition.

To this end, the FIG. 8B is a side view of the FIG. 8A connector 22 in which the first connector portion 30 and the second connector portion 32 assume the disengaged condition. Thus, by way of example only, there may be a space between the second connector portion 32 and the first connector portion 30 in the disengaged condition.

In FIG. 8C, the first connector portion 30 and the second connector portion 32 assume the engaged condition, in which the first connector portion 30 and the second connector portion 32 are in contact. Purely by way of example, and is indicated in FIG. 8C, the first connector portion 30 may form a part of the connector loop 40. As a non-limiting example, the first connector portion 30 may form part of, or be constituted by, a portion of the connector loop 40 being located closest to the second anchor portion 26. In the FIG. 8A example, the second anchor portion 26 is rigidly connected to the center unit 16. However, it is also envisaged that in other examples, the second anchor portion 26 may be rigidly connected to the second frame rail 20.

Furthermore, although the example illustrated in FIGS. 8A-8C is presented without any load transmitter such that the first connector portion 30 is spaced from the second connector portion 32 when the vehicle 10 is in the initial state, it is also envisaged that other examples may comprise a load transmitter (not shown in FIGS. 8A-8C) between the first connector portion 30 is spaced from the second connector portion 32.

Purely by way of example, as illustrated in the non-limiting examples in FIGS. 6A-6C, FIGS. 7A-7C or FIGS. 8A-8C, the connector 22 can only transfer a load between the first anchor portion 24 and the second anchor portion 26 when the first connector portion 30 and the second connector portion 32 assume the engaged condition. As such, by way of example only, the connector 22 may be such that no load can be transferred between the first anchor portion 24 and the second anchor portion 26 via the connector 22 when the first connector portion 30 and the second connector portion 32 assume the disengaged condition.

13

With reference to FIGS. 6A-6C, FIG. 7A-7C, or 8A-8C, in some examples, the first connector portion 30 is connected to the first anchor portion 24 via a first connector arm 34, preferably the first connector arm 34 is made of metal, such as steel, the second connector portion 32 being connected to the second anchor portion 26 via a second connector arm 36, preferably the second connector arm 36 is made of metal, such as steel.

With reference to FIGS. 6A-6C, FIGS. 7A-7C, or 8A-8C, in some examples, the first connector portion 30 and the first connector arm 34 form a unitary component and the second connector portion 32 and the second connector arm 36 form a unitary component.

Figure 9:
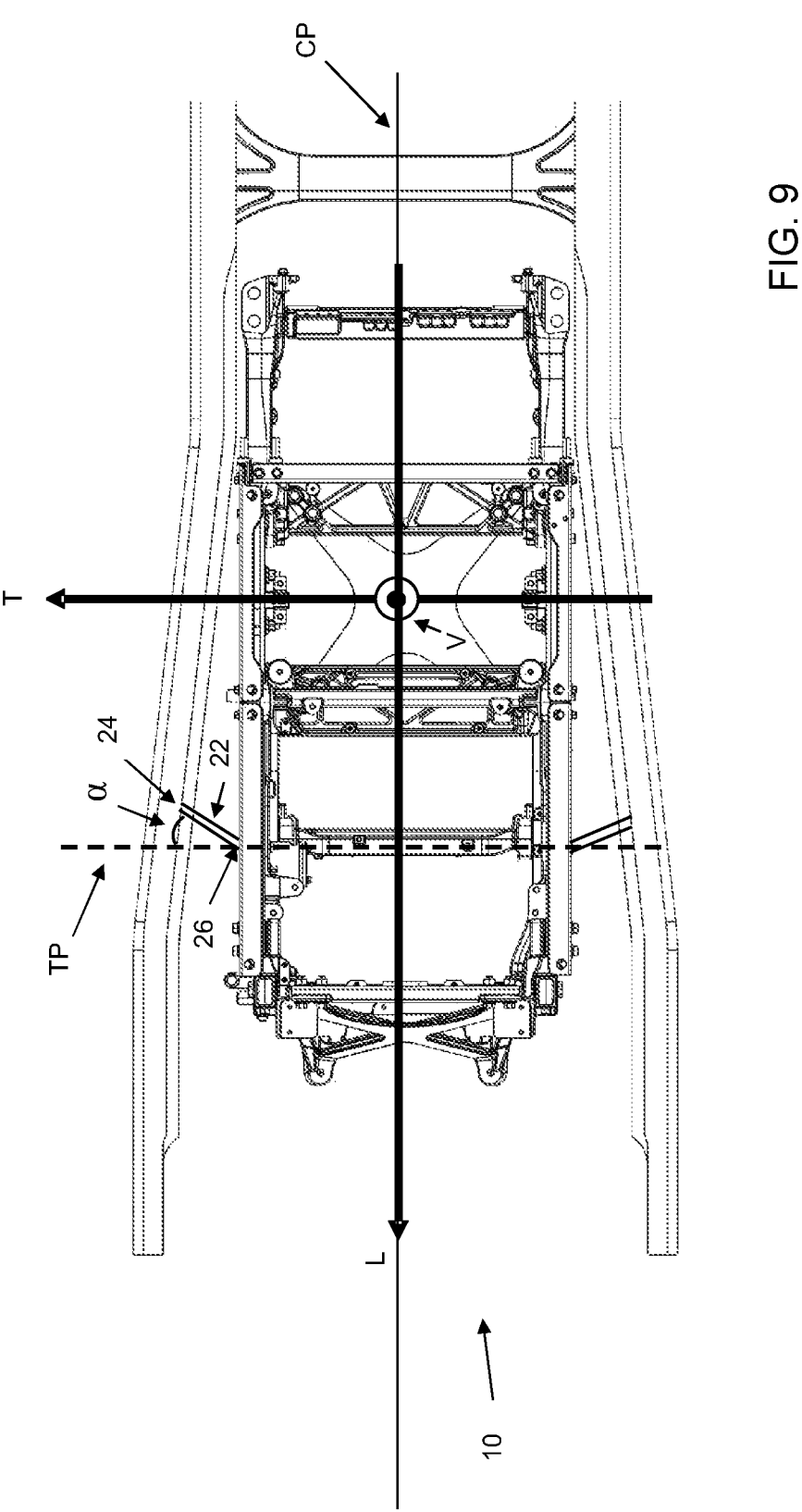
FIG. 9 is an exemplary portion of a vehicle.

With reference to FIG. 9, irrespective of the implementation of the connector 22, in some examples, the connector 22 may form an angle α having an absolute value that may be in the range of 0°-70°, with a transversal plane TP extending in the transversal direction T and in the vertical direction V. The extension between first anchor portion 24 and the second anchor portion 26 may be used as the extension of the connector 22 when determining the angle between the transversal plane TP and the connector 22. In examples in which the connector 22 comprises a set of connector elements, the location of each one of the first anchor portion 24 and the second anchor portion 26 may be determined in accordance with the procedure outlined hereinabove with reference to FIG. 5.

In some examples, the connector 22 may form an angle α having an absolute value that may be in the range of 30°-70°, preferably in the range of 40°-60°, with the transversal plane TP extending in the transversal direction T and in the vertical direction V.

In some examples, the connector 22 may form an angle α having an absolute value that may be in the range of 0°-20° with the transversal plane TP extending in the transversal direction T and in the vertical direction V.

In some examples, a distance difference between the deformed distance and the initial distance may be greater than 2 mm, preferably greater than 5 mm, more preferred greater than 10 mm. In examples of the vehicle 10 comprising a connector 22 with one or more flexible elements, see e.g., the above examples that are presented with reference to FIG. 3, FIG. 5 or FIG. 9, the above distance may for instance be achieved by a certain slack in the cables in the initial state. In examples of the vehicle 10 comprising a connector 22 with first connector portion 30 and a second connector portion 32, the above distance may for instance be achieved by an appropriate choice of an initial separation distance ISD and a deformed separation distance DSD (see e.g. the example presented above with reference to FIG. 6A-6C) or by an appropriate choice of a distance by which the first connector portion 30 and the second connector portion 32 are spaced from each other in a disengaged condition (see e.g. the example presented above with reference to FIG. 7A-7C). In examples of the vehicle 10 comprising a connector 22 with one or more cables, the above distance may for instance be achieved by an appropriate choice of a slack of the cable or cables in the initial condition.

In some examples, a distance difference between the deformed distance and the initial distance may be smaller than 25 mm, preferably smaller than 20 mm. As non-limiting examples, the distance differences mentioned above may be achieved using the same implementations as the examples mentioned in the previous paragraph.

Figure 10:
FIG. 10 is comparison between two vehicles.

Finally, FIG. 10 presents a comparison between a vehicle 10 without a connector (to the left in FIG. 10) and a vehicle 10 comprising a connector (to the right in FIG. 10). As indicated by the dashed lines in FIG. 10 and as has been intimated above with reference to FIG. 2 in the event of a collision, such as a forward collision, the frame rails 18', 20' may be deformed. As may be gleaned from FIG. 10, the deformation of the rails 18, 20 of the vehicle 10 comprising the connector 22 may be less pronounced that the deformation of the rails 18, 20 of the vehicle 10 without the connector. Moreover, as indicated in FIG. 10, the first frame rail 18 is located further from the center plane CP in the deformed state than in the initial state.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

What is claimed is:
1. A vehicle comprising a center unit, a first frame rail, and a second frame rail;

the vehicle having a vehicle longitudinal extension in a vehicle longitudinal direction, a vehicle transversal extension in a vehicle transversal direction, and a vehicle vertical extension in a vehicle vertical direction, the vehicle longitudinal direction corresponding to an intended direction of travel of the vehicle when travelling straight ahead, the vehicle vertical direction corresponding to a direction of a normal to a planar surface supporting the vehicle and the vehicle transversal direction being perpendicular to each one of the vehicle longitudinal direction and the vehicle vertical direction, the vehicle further comprising a center plane extending in the vehicle longitudinal direction and in the vehicle vertical direction and being located in a transversal center of the vehicle;

wherein the first frame rail and the second frame rail are located on opposite sides of the center plane and wherein the center unit is located at least partially between the first frame rail and the second frame rail in the transversal direction;

wherein the vehicle comprises a connector being connected to a first anchor portion of the vehicle and to a second anchor portion of the vehicle and extending between the first anchor portion and the second anchor portion, the first anchor portion being rigidly connected to the first frame rail and the second anchor portion being rigidly connected to the center unit or to the second frame rail;

the vehicle having an initial state with an initial distance between the first anchor portion and the second anchor portion, the vehicle also being adapted to assume a deformed state with a deformed distance between the first anchor portion and the second anchor portion, the deformed distance being greater than the initial distance;

the connector having an initial tensile stiffness in a direction between the first anchor portion and the second anchor portion when the vehicle is in the initial state, the connector having a deformed tensile stiffness in the direction between the first anchor portion and the second anchor portion when the vehicle is in the deformed state, the initial tensile stiffness being smaller than the deformed tensile stiffness;

wherein the connector comprises a first connector portion connected to the first anchor portion and a second connector portion connected to the second anchor portion;

the first connector portion and the second connector portion being adapted to assume a disengaged condition, in which the first connector portion is spaced from, and thus not in contact with, the second connector portion, when the vehicle is in the initial state; and the first connector portion and the second connector portion being adapted to assume an engaged condition, in which the first connector portion and the second connector portion are in contact, when the vehicle is in the deformed state.

2. The vehicle of claim 1, wherein a ratio between the initial tensile stiffness and the deformed tensile stiffness is less than 0.1.

3. The vehicle of claim 1, wherein the vehicle has a vehicle deadweight, a tensile strength of the connector in the direction between the first anchor portion and the second anchor portion being less than 300%.

4. The vehicle of claim 1, wherein the vehicle has a vehicle deadweight, a tensile strength of the connector in the direction between the first anchor portion and the second anchor portion being greater than 10%.

5. The vehicle of claim 1, wherein the connector has a load transmitting ratio between a maximum tensile load transmittable via the connector and a maximum compression load transmittable via the connector, the load transmitting ratio being at least 50.

6. The vehicle of claim 1, wherein the connector comprises a cable.

7. The vehicle of claim 6, wherein the cable is slacked in the initial state.

8. The vehicle of claim 1, wherein the connector comprises a first connector portion connected to the first anchor portion and a second connector portion connected to the second anchor portion, the connector being such that:

the first connector portion and the second connector portion are separated by an initial separation distance when the vehicle is in the initial state; and the first connector portion and the second connector portion are separated by a deformed separation distance when the vehicle is in the deformed state;

wherein a ratio between the deformed separation distance and the initial separation distance is less than 0.5.

9. The vehicle of claim 8, wherein the first connector portion is connected to the first anchor portion via a first connector arm and wherein the second connector portion is connected to the second anchor portion via a second connector arm.

10. The vehicle of claim 9, wherein the first connector portion and the first connector arm form a unitary component and wherein the second connector portion and the second connector arm form a unitary component.

11. The vehicle of claim 1, wherein the connector can only transfer a load between the first anchor portion and the second anchor portion when the first connector portion and the second connector portion assume the engaged condition.

12. The vehicle of claim 1, wherein one of the first connector portion and the second connector portion at least forms part of a connector loop enclosing a connector portion area, the other one of the first connector portion and the second connector portion extending into the connector portion area at least when the first connector portion and the second connector portion assume the disengaged condition.

13. The vehicle of claim 1, wherein the connector forms an angle having an absolute value being in the range of 0°-70°, with a transversal plane extending in the transversal direction and in the vertical direction.

14. The vehicle of claim 13, wherein the connector forms an angle in the range of 30°-70° with the transversal plane extending in the transversal direction and in the vertical direction.

15. The vehicle of claim 13, wherein the connector forms an angle having an absolute value being in the range of 0°-20° with the transversal plane extending in the transversal direction and in the vertical direction.

16. The vehicle of claim 1, wherein a distance difference between the deformed distance and the initial distance is greater than 2 mm.

17. The vehicle of claim 1, wherein a distance difference between the deformed distance and the initial distance is smaller than 25 mm.

18. The vehicle of claim 1, wherein the first frame rail is located further from the center plane in the deformed state than in the initial state.

19. The vehicle of claim 1, wherein the vehicle comprises an electric motor for propelling the vehicle, the center unit comprising a battery assembly for supplying electric energy to the electric motor.

* * * * *